Dec. 22, 1925.
W. M. MYERS
PUMP
Filed March 22, 1923
1,566,340
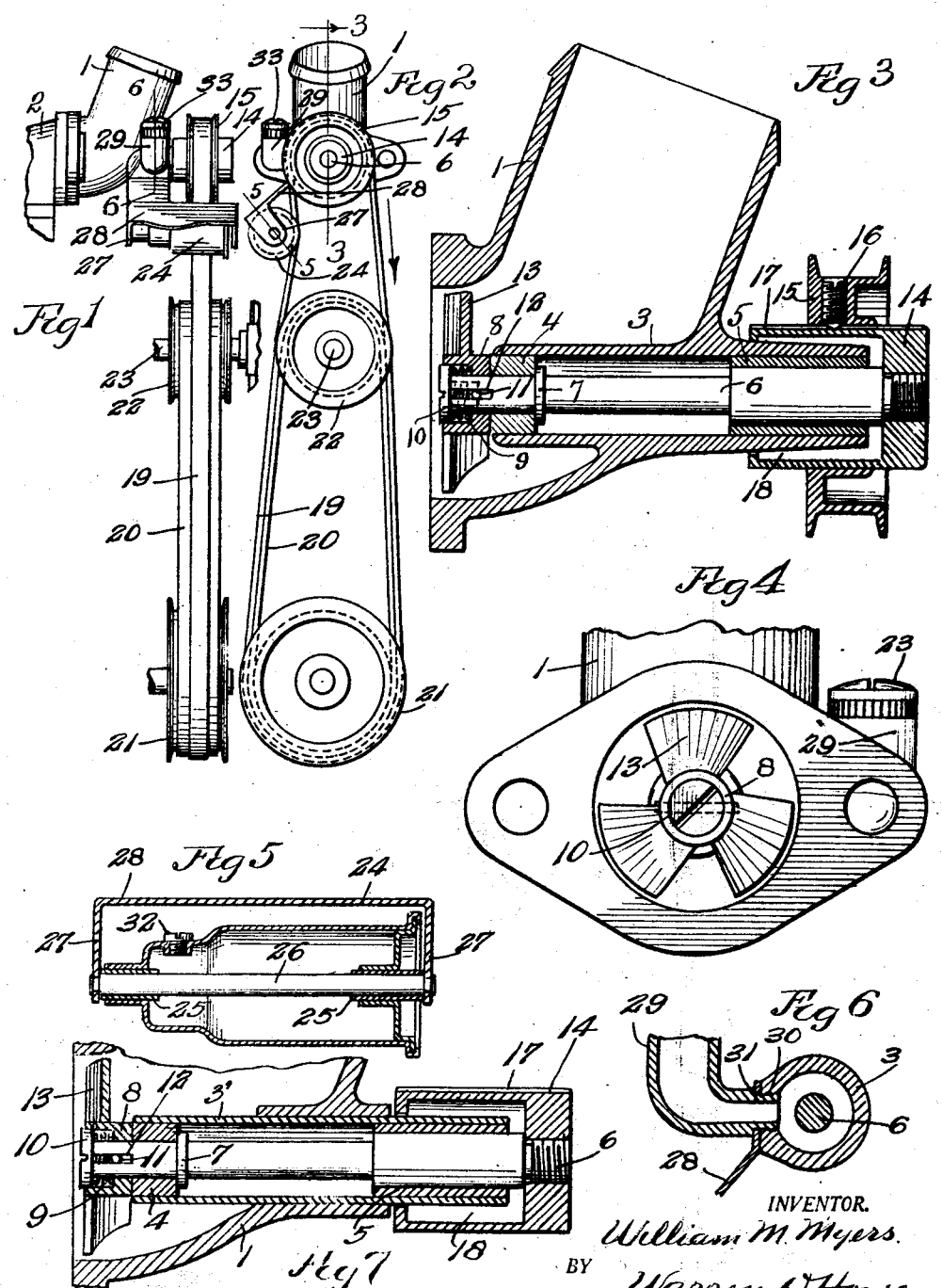
INVENTOR.
William M. Myers.
BY Warren D. House,
His ATTORNEY.
Witness:
R. E. Hamilton Patented Dec. 22, 1925.

1,566,340

UNITED STATES PATENT OFFICE.

WILLIAM M. MYERS, OF ST. JOSEPH, MISSOURI.

PUMP.

Application filed March 22, 1923. Serial No. 626,829.

*To all whom it may concern:*

Be it known that I, WILLIAM M. MYERS, a citizen of the United States, residing at St. Joseph, in the county of Buchanan and State of Missouri, have invented a certain new and useful Improvement in Pumps, of which the following is a specification.

My invention relates to improvements in pumps. It relates particularly to pumps employed for cooling the water in automobile radiators, of the type in which a rotary propeller is installed in the return passage which connects the engine with the radiator.

One of the objects of my invention is to provide in a mechanism of the kind described, a construction which effects proper lubrication of the propeller shaft, which provides novel and efficient means for preventing leakage of the lubricating material, which is simple, cheap to make, durable, not liable to get out of order, which can be readily applied to machines now in use, and which affords automatic lubrication when the bearings for the propeller shaft become heated.

My invention provides further novel means for driving the propeller shaft from the fan belt of the automobile.

My invention provides further novel means for tightening the propeller shaft driving belt.

My invention provides further a novel self lubricating loose pulley.

My invention provides still further novel means for adjusting the driving belt with respect to the fan belt and propeller shaft.

The novel features of my invention are hereinafter fully described and claimed.

In the accompanying drawing, which illustrates my invention,

Fig. 1 is a side elevation of my improved pump mechanism and parts of the automobile connected therewith.

Fig. 2 is a front view of the same.

Fig. 3 is an enlarged vertical section on the line 3—3 of Fig. 2.

Fig. 4 is an enlarged inside elevation, broken away, of what is shown in Fig. 3, Fig. 5 is an enlarged sectional view on the line 5—5 of Fig. 2, Fig. 6 is an enlarged sectional view on the line 6—6 of Fig. 1, Fig. 7 is a vertical sectional view, similar to Fig. 3, of a modified form of casing for supporting the propeller shaft.

Similar reference characters designate similar parts in the different views.

1 designates a casing comprising an elbow adapted to be bolted in place of the usual elbow, which is attached to the water jacket 2, Fig. 1, of an ordinary automobile engine, and which carries the water from the engine to the radiator, in a manner well known.

Referring particularly to Figs. 1 to 6, 3 designates a horizontal lubricant receptacle, preferably integral with the casing 1 and extending into and out of the latter and having rigidly fastened therein an inner shaft bearing 4, and an outer shaft bearing 5, which are spaced apart and in which is rotatably mounted a horizontal propeller shaft 6, provided with an annular flange 7, which forms an abutment that bears against the front end of the shaft bearing 4.

Longitudinally slidable on the shaft 6 is a propeller having a hub 8, which bears against the rear end of the bearing 4, against which it is held by means of a coil spring 9, which encircles the shaft 6, and which bears at its front end against the hub 8, and at its rear end against an abutment comprising the head of a screw 10, which is mounted in a screw-threaded hole provided in the rear end of the shaft 6.

To hold the hub 8 from rotating around the shaft 6, a pin 11 is extended through the hub 8 and through an end slot 12 in the rear end of the shaft 6. The spring 9 holds the hub 8 against the bearing 4, and by bearing on the head of the screw 10, the spring holds the annular flange 7 against the bearing 4. The hub 8 has extending from it radial propeller blades 13 inclined so that when the shaft 6 is rotated clockwise, as viewed in Fig. 2, water will be forced by the blades 13 from the engine water jacket 2 upwardly through the elbow 1 to the radiator, not shown. The spring 9 is of sufficient strength to hold the hub against the bearing 4 against the thrust of the propeller blades, which tend to force the hub from said bearing.

For rotating the shaft 6, the forward end of the latter is threaded and has mounted on such threaded end a hollow hub 14 of a pulley having a body 15 longitudinally adjustable on the hub 14 and held from turning thereon by a set screw 16 mounted in the body 15 and having its inner end disposed in a peripheral longitudinal groove 17 in the hub 14. The latter has a lubricant receptacle 18 into which extends the outer end of the lubricant receptacle 3, Fig. 3.

A belt 19 is mounted on the body 15 and embraces the fan belt 20, which is mounted on the usual driving pulley 21 and the pulley 22 mounted on the fan shaft 23. The belt 20 drives the belt 19. By loosening the set screw 16, the body 15 may be longitudinally adjusted on the hollow hub 14 to a position in alinement with the belt 20, in which position it is secured by tightening the set screw 16.

The belt 19 is tightened by means of a hollow idle pulley 24, Figs 1, 2 and 5, the ends of which are rotatable on bearings 25 mounted on a horizontal rod 26, the ends of which are respectively secured in ears 27 of a spring plate 28 through which extends the lower threaded end of a right angled filling tube 29, the lower threaded end of which is fitted in a threaded hole 30 in the wall of the lubricant receptacle 3 intermediate of the bearings 4 and 5.

The filling tube 29 has an annular shoulder 31 which bears against the plate 28 and holds the latter against the receptacle 3. The filling tube thus performs a double function, that of a filling tube and as a fastening means for the plate 28. By bending the latter, it may be adjusted so as to afford the proper pressure of the pulley 24 against the belt 19. The pulley 24 has a peripheral threaded filling hole in which is fitted a removable screw plug 32, Fig. 5. Lubricating material placed in the idle pulley 24 will automatically lubricate the bearings 25.

The upper end of the filling tube 29 is threaded and has fitted thereon a removable screw cap 33. Lubricating material is inserted through the filling tube 29 into the receptacle 3. The lubricating material is preferably greased, which lubricates the shaft 6 and bearings 4 and 5. Such grease as passes outwardly between the bearing 5 and the shaft 6 will enter the lubricant receptacle 18 in the hub 14, where it hardens. If the bearing 5 becomes heated, the hard grease next the outer end of the bearing 5 will soften and will lubricate the bearing 5.

By mounting the belt 19 on the fan belt 20, an extra pulley is eliminated and an efficient driving means is afforded for the belt 19.

The modified form, shown in Fig. 7, is the same in construction as that shown in Fig. 3, excepting that the integral lubricant receptacle 3 of Fig. 3, is replaced in the form shown in Fig. 7, by a horizontal tube 3', which contains the bearings 4 and 5, and which is mounted in a horizontal hole provided in the elbow casing 1.

In the operation of the invention, when the fan belt 20 is driven, the shaft 6 will be rotated by means of the belt 19, pulley body 15 and hub 14, thus rotating the hub 8 and revolving the blades 13, whereby water is forced from the water jacket 2 through the elbow casing 1 and connecting hose, not shown, to the automobile radiator.

In applying the pump to an automobile of a usual type, the elbow casing 1 is substituted for the one which is originally on the machine, the same bolts being used for fastening the casing to the water jacket of the engine.

By adjusting the body 15 on the hub 14, the belt 19 may be disposed to aline with the fan belt 20, which, in different engines, is at different distances from the body of the engine.

The spring 9 by holding the hub 8 against the bearing 4 and the flange 7 against the bearing 4, prevents water passing outwardly into the receptacle 3, and oil from passing from said receptacle into the casing elbow 1. By the use of this construction stuffing boxes are eliminated.

I do not limit my invention to the structures shown and described, as many modifications, within the scope of the appended claims may be made, without departing from the spirit of my invention.

What I claim is:—

1. In a pump of the kind described, a casing having a passage for water, a shaft bearing in said casing, a shaft rotatable in said bearing and having two abutments one of which bears against one end of said bearing, a propeller having a hub longitudinally slidable on said shaft between said abutments and rotatable with said shaft and having blades arranged, when the propeller is rotated in one direction, to tend to force the hub of the propeller from the other end of said bearing, and a spring having a bearing against the other abutment and against the hub of the propeller and having strength sufficient to force the hub against said bearing against the thrust of said blades substantially as set forth.

2. In a pump of the kind described, a casing having a passage for water, a shaft bearing in said casing, a shaft rotatable in said bearing and having an abutment which bears against one end of said bearing and provided with a screw threaded hole in one end, a screw fitted in said hole and having a head which forms an abutment on the shaft, the shaft having a longitudinal slot, a propeller having a hub which bears against the other end of said bearing and which is slidable longitudinally on the shaft, said hub having a pin extending into and slidable in said slot, the propeller having blades disposed in said passage and arranged, when the propeller is rotated in one direction, to tend to force the hub from said bearing, and a coil spring encircling said shaft and bearing at one end against the head of said screw and bearing at its other end against said hub and having strength sufficient to force the latter against said bearing against the thrust of said blades, substantially as set forth.

3. In a pump of the kind described, a bearing, a shaft rotatable therein having an annular abutment which bears against one end of said bearing, a propeller having a hub longitudinally slidable on said shaft and rotatable therewith and bearing against the other end of said bearing, and a spring strong enough for normally forcing said hub against said bearing against the thrust of said blades, substantially as set forth.

4. In a pump of the kind described, a bearing, a shaft rotatable therein having an annular abutment which bears against one end of said bearing, a propeller rotatable with and longitudinally slidable on said shaft and which bears against the other end of said bearing, the propeller having blades arranged, when the propeller rotates in one direction to tend to force the propeller from said bearings, and a spring which normally forces the propeller against said bearing against the thrust of said blades, substantially as set forth.

In testimony whereof I have signed my name to this specification.

WILLIAM M. MYERS.